United States Patent
Shi et al.

(10) Patent No.: US 11,636,800 B2
(45) Date of Patent: Apr. 25, 2023

(54) PIXEL CIRCUIT, PHOTOELECTRIC DETECTION SUBSTRATE, PHOTOELECTRIC DETECTION DEVICE AND DRIVING METHOD

(71) Applicant: BOE Technology Group Co., Ltd., Beijing (CN)

(72) Inventors: Lubin Shi, Beijing (CN); Fuqiang Li, Beijing (CN); Tingting Zhou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/489,612

(22) Filed: Sep. 29, 2021

(65) Prior Publication Data

US 2022/0172665 A1 Jun. 2, 2022

(30) Foreign Application Priority Data

Nov. 27, 2020 (CN) .......................... 202011364399.3

(51) Int. Cl.
*G06F 3/01* (2006.01)
*G09G 3/20* (2006.01)

(52) U.S. Cl.
CPC ... *G09G 3/2092* (2013.01); *G09G 2300/0408* (2013.01); *G09G 2310/061* (2013.01)

(58) Field of Classification Search
CPC ......... G09G 3/2092; G09G 2300/0408; G09G 2310/061; H04N 5/365; H04N 5/361; H04N 5/357; H04N 5/374; H04N 5/3741; H04N 5/3745; G06F 3/01
See application file for complete search history.

(56) References Cited

U.S. PATENT DOCUMENTS

| | | | |
|---|---|---|---|
| 6,917,027 B2* | 7/2005 | Krymski | H04N 5/363 257/292 |
| 2009/0095986 A1* | 4/2009 | Neukom | H04N 5/3575 257/225 |
| 2009/0256060 A1* | 10/2009 | Meynants | H04N 5/3575 250/214 A |
| 2013/0258151 A1* | 10/2013 | Ayers | H04N 5/3592 348/E5.091 |
| 2017/0350755 A1* | 12/2017 | Geurts | H04N 5/3559 |
| 2018/0342546 A1* | 11/2018 | Chao | H04N 5/359 |
| 2019/0058840 A1* | 2/2019 | Geurts | H04N 5/3745 |
| 2020/0195863 A1* | 6/2020 | Shim | H04N 5/374 |

(Continued)

*Primary Examiner* — Jose R Soto Lopez
(74) *Attorney, Agent, or Firm* — IPro, PLLC (57) ABSTRACT

A pixel circuit includes: a charge storage circuit with first and second terminals thereof electrically coupled to first and second nodes, respectively; a reset circuit with first, second and third control terminals thereof electrically coupled to a reference signal line, a first initialization signal line, and a second initialization signal line, respectively, with fourth, fifth and sixth terminals thereof electrically coupled to the first node, a cathode of a photodiode and the second node, respectively; a photosensitive control circuit with first, second and third terminals thereof electrically coupled to an anode of the photodiode, the first node and the second node, respectively; an output circuit with first and second terminals thereof electrically coupled to a first level terminal and a fourth terminal of the photosensitive control circuit, respectively.

19 Claims, 5 Drawing Sheets

(56) References Cited

U.S. PATENT DOCUMENTS

2021/0035490 A1* 2/2021 Feng .................... G09G 3/32
2021/0313379 A1* 10/2021 Yin ................... H01L 27/14656
2021/0337155 A1* 10/2021 Chu ....................... H04N 5/353

* cited by examiner

FIG. 5 in a reset stage, controlling the first terminal and the fourth terminal of the reset circuit to be in a conducting state, controlling the second terminal and the fifth terminal of the reset circuit to be in a conducting state, controlling the third terminal and the sixth terminal of the reset circuit to be in a conducting state, controlling the first terminal and the second terminal of the output circuit to be in a conducting state, writing a reference level to the first node, and initializing levels of the photodiode and the second node ⟶ S601 in a photosensitive stage, controlling the first terminal and the fourth terminal of the reset circuit to be in a disconnected state, controlling the second terminal and the fifth terminal of the reset circuit to be in a disconnected state, controlling the third terminal and the sixth terminal of the reset circuit to be in a disconnected state, controlling the first terminal and the second terminal of the photosensitive control circuit to be in a conducting state, and controlling the third terminal and the fourth terminal of the photosensitive control circuit to be in a conducting state, thereby writing an induced level generated by induced charges of the photodiode into the first node, and writing a threshold voltage of a switch element electrically coupled with the first control terminal of the output circuit and a first level of the first level terminal into the second node ⟶ S602 in a reading phase, controlling the first terminal and the second terminal of the photosensitive control circuit to be in a disconnected state, controlling the third terminal and the fourth terminal of the photosensitive control circuit to be in a disconnected state; controlling the first terminal and the fourth terminal of the reset circuit to be in a conducting state, controlling the first terminal and the third terminal of the output circuit to be in a conducting state; under action of the charge storage circuit, enabling a level of the second node to become a driving level, thereby enabling the third terminal of the output circuit to output a driving current; wherein the driving level is generated based on the induced level and a sum of the threshold voltage, the first level and the reference level ⟶ S603

PIXEL CIRCUIT, PHOTOELECTRIC DETECTION SUBSTRATE, PHOTOELECTRIC DETECTION DEVICE AND DRIVING METHOD

CROSS-REFERENCE TO RELATED APPLICATIONS

The present application claims a priority to the Chinese patent application No. 202011364399.3 filed in China on Nov. 27, 2020, a disclosure of which is incorporated herein by reference in its entirety.

TECHNICAL FIELD

The present application relates to the field of photoelectric detection technologies. Specifically, the present application relates to a pixel circuit, a photoelectric detection substrate, a photoelectric detection device and a driving method.

BACKGROUND

A current at an output end of a switching element of an output circuit in a pixel circuit linearly follows a level change of a gate electrode of the switch element. However, due to body effect and uniformity of a metal oxide semiconductor (MOS) or a thin film transistor (TFT), an output level or current does not have an ideal linear relationship.

Under different source-drain voltages $V_{gs}$, driving currents $I_{ds}$ of a thin film transistor (TFT) are different. For thin film transistors (TFTs) in a photoelectric detection substrate, there are differences in uniformity of different TFTs. Due to the differences in the uniformity of the TFTs, under the same $V_{gs}$, there will also be differences in output driving currents $I_{ds}$ of the TFTs, resulting in reduction of detection uniformity and accuracy of a driving current output by the pixel circuit in the related art.

SUMMARY

In a first aspect, one embodiment of the present disclosure provides a pixel circuit, including:

a charge storage circuit; wherein a first terminal and a second terminal of the charge storage circuit are electrically coupled to a first node and a second node, respectively;

a reset circuit; wherein a first control terminal of the reset circuit is electrically coupled to a reset control signal line, a second control terminal of the reset circuit is electrically coupled to a scan signal line; a first terminal, a second terminal and a third terminal of the reset circuit are electrically coupled to a reference signal line, a first initialization signal line, and a second initialization signal line, respectively; a fourth terminal, a fifth terminal, and a sixth terminal of the reset circuit are electrically coupled to the first node, a photodiode of the pixel circuit and the second node, respectively;

a photosensitive control circuit; wherein a control terminal of the photosensitive control circuit is electrically coupled to a gate signal line; a first terminal, a second terminal and a third terminal of the photosensitive control circuit are electrically coupled to the photodiode, the first node and the second node, respectively; and an output circuit; wherein a first control terminal of the output circuit is electrically coupled to the second node, a second control terminal of the output circuit is electrically coupled to a scan signal line; a first terminal and a second terminal of the output circuit are electrically coupled to a first level terminal and a fourth terminal of the photosensitive control circuit, respectively.

In a possible implementation, the reset circuit includes a first reset circuit, a second reset circuit, and a third reset circuit; control terminals of the second reset circuit and the third reset circuit and a first control terminal of the first reset circuit collectively serve as the first control terminal of the reset circuit; a second control terminal of the first reset circuit serves as the second control terminal of the reset circuit; a first terminal and a second terminal of the first reset circuit serve as the first terminal and the fourth terminal of the reset circuit, respectively; a first terminal and a second terminal of the second reset circuit serve as the second terminal and the fifth terminal of the reset circuit, respectively; a first terminal and a second terminal of the third reset circuit serve as the third terminal and the sixth terminal of the reset circuit, respectively.

In a possible implementation, the photosensitive control circuit includes a first switch circuit and a second switch circuit; control terminals of the first switch circuit and the second switch circuit collectively serve as the control terminal of the photosensitive control circuit; a first terminal and a second terminal of the first switch circuit serve as the first terminal and the second terminal of the photosensitive control circuit, respectively; a first terminal and a second terminal of the second switch circuit serve as the third terminal and the fourth terminal of the photosensitive control circuit, respectively.

In a possible implementation, the output circuit includes a first driving circuit and a second driving circuit; a control terminal and a first terminal of the first driving circuit serve as the first control terminal and the first terminal of the output circuit, respectively; a second terminal of the first driving circuit and a first terminal of the second driving circuit together serve as the second terminal of the output circuit; a control terminal and a second terminal of the second driving circuit serve as the second control terminal and the third terminal of the output circuit, respectively.

In a possible implementation, the first reset circuit includes a first switch element and a second switch element; a control terminal of the first switch element and a control terminal of the second switch element serve as the first control terminal and the second control terminal of the first reset circuit, respectively; a first terminal of the first switch element and a first terminal of the second switch element together serve as the first terminal of the first reset circuit; a second terminal of the first switch element and a second terminal of the second switch element together serve as the second terminal of the first reset circuit.

In a possible implementation, the second reset circuit includes a third switch element; a control terminal, a first terminal and a second terminal of the third switch element serve as the control terminal, the first terminal and the second terminal of the second reset circuit, respectively; the third reset circuit includes a fourth switch element; a control terminal, a first terminal and a second terminal of the fourth switch element serve as the control terminal, the first terminal and the second terminal of the third reset circuit, respectively.

In a possible implementation, the first switch circuit includes a fifth switch element; a control terminal, a first terminal and a second terminal of the fifth switch element serve as the control terminal, the first terminal and the second terminal of the first switch circuit, respectively; the second switch circuit includes a sixth switch element; a control terminal, a first terminal and a second terminal of the sixth switch element serve as the control terminal, the first terminal and the second terminal of the second switch circuit, respectively.

In a possible implementation, the first driving circuit includes a seventh switch element; a control terminal, a first terminal and a second terminal of the seventh switch element serve as the control terminal, the first terminal and the second terminal of the first driving circuit, respectively; the second driving circuit includes an eighth switch element; a control terminal, a first terminal and a second terminal of the eighth switch element serve as the control terminal, the first terminal and the second terminal of the second driving circuit, respectively.

In a second aspect, one embodiment of the present disclosure provides a photoelectric detection substrate, including: a plurality of reset control signal lines; a plurality of scan signal lines; a plurality of reference signal lines; a plurality of first initialization signal lines; a plurality of second initialization signal lines; a plurality of gate signal lines; and an array of pixel circuits. Each pixel circuit includes: a charge storage circuit, a reset circuit, a photosensitive control circuit, and an output circuit; a first terminal and a second terminal of the charge storage circuit are electrically coupled to a first node and a second node, respectively; a first control terminal of the reset circuit is electrically coupled to a reset control signal line, a second control terminal of the reset circuit is electrically coupled to a scan signal line; a first terminal, a second terminal and a third terminal of the reset circuit are electrically coupled to a reference signal line, a first initialization signal line, and a second initialization signal line, respectively; a fourth terminal, a fifth terminal, and a sixth terminal of the reset circuit are electrically coupled to the first node, a photodiode of the pixel circuit and the second node, respectively; a control terminal of the photosensitive control circuit is electrically coupled to a gate signal line; a first terminal, a second terminal and a third terminal of the photosensitive control circuit are electrically coupled to the photodiode, the first node and the second node, respectively; a first control terminal of the output circuit is electrically coupled to the second node, a second control terminal of the output circuit is electrically coupled to a scan signal line; a first terminal and a second terminal of the output circuit are electrically coupled to a first level terminal and a fourth terminal of the photosensitive control circuit, respectively. The first control terminal of the reset circuit of each pixel circuit is electrically coupled to one reset control signal line; the second control terminal of the reset circuit of each pixel circuit is electrically coupled to one scan signal line; the first terminal, the second terminal and the third terminal of the reset circuit of each pixel circuit are electrically coupled to one reference signal line, one first initialization signal line, and one second initialization signal line, respectively. The control terminal of the photosensitive control circuit of each pixel circuit is electrically coupled to one gate signal line. The second control terminal of the output circuit of each pixel circuit is electrically coupled to one scanning signal line.

In a possible implementation, the photoelectric detection substrate further includes a plurality of amplifying circuits; the third terminal of the output circuit of each pixel circuit is electrically coupled to a first terminal of one amplifier circuit; a second terminal of the amplifying circuit is electrically coupled to a second level terminal, and a third terminal of the amplifying circuit is configured to output an amplified output current.

In a possible implementation, the photoelectric detection substrate further includes a substrate; the amplifying circuit and the pixel circuit are on the substrate.

In a possible implementation, the photoelectric detection substrate further includes a first substrate and a second substrate; the pixel circuit is on the first substrate; and the amplifying circuit is on the second substrate.

In a possible implementation, the reference signal line, the first initialization signal line and the second initialization signal line electrically coupled to one identical pixel circuit are one identical signal line.

In a possible implementation, the pixel circuits in one identical row are electrically coupled to one identical reset control signal line; the pixel circuits in one identical row are electrically coupled to one identical reference signal line; the pixel circuits in one identical row are electrically coupled to one identical first initialization signal line; the pixel circuits in one identical row are electrically coupled to one identical second initialization signal line; the pixel circuits in one identical row are electrically coupled to one identical gate signal line; the pixel circuits in one identical row are electrically coupled to one identical scan signal line.

In a possible implementation, the pixel circuits in one identical column are electrically coupled to one identical read signal line; the pixel circuits in one identical column are electrically coupled to one identical first level terminal.

In a third aspect, one embodiment of the present disclosure provides a photoelectric detection device, including foregoing photoelectric detection substrate.

In a fourth aspect, one embodiment of the present disclosure provides a driving method applied to the foregoing pixel circuit, including in a reset stage, controlling the first terminal and the fourth terminal of the reset circuit to be in a conducting state, controlling the second terminal and the fifth terminal of the reset circuit to be in a conducting state, controlling the third terminal and the sixth terminal of the reset circuit to be in a conducting state, controlling the first terminal and the second terminal of the output circuit to be in a conducting state, writing a reference level to the first node, and initializing levels of the photodiode and the second node;

in a photosensitive stage, controlling the first terminal and the fourth terminal of the reset circuit to be in a disconnected state, controlling the second terminal and the fifth terminal of the reset circuit to be in a disconnected state, controlling the third terminal and the sixth terminal of the reset circuit to be in a disconnected state, controlling the first terminal and the second terminal of the photosensitive control circuit to be in a conducting state, and controlling the third terminal and the fourth terminal of the photosensitive control circuit to be in a conducting state, thereby writing an induced level generated by induced charges of the photodiode into the first node, and writing a threshold voltage of a switch element electrically coupled to the first control terminal of the output circuit and a first level of the first level terminal into the second node;

in a reading phase, controlling the first terminal and the second terminal of the photosensitive control circuit to be in a disconnected state, controlling the third terminal and the fourth terminal of the photosensitive control circuit to be in a disconnected state; controlling the first terminal and the fourth terminal of the reset circuit to be in a conducting state, controlling the first terminal and the third terminal of the output circuit to be in a conducting state; under action of the charge storage circuit, enabling a level of the second node to become a driving level, thereby enabling the third terminal of the output circuit to output a driving current; wherein the driving level is generated based on the induced level and a sum of the threshold voltage, the first level and the reference level.

Beneficial technical effects of the technical solutions provided in the embodiments of the present application are:

According to the driving method of the pixel circuit of the embodiment of the present application, in the photosensitive stage, an induced level generated by induced charges of the photodiode can be written into the first node, and a threshold voltage of a switch element electrically coupled to the first control terminal of the output circuit and a first level of the first level terminal can be written into the second node; in the reading phase, under action of the charge storage circuit, a level of the second node becomes a driving level, thereby enabling the third terminal of the output circuit to output a driving current. In the above process, the pixel circuit can compensate a threshold voltage of a switching element electrically coupled to the first control terminal of the output circuit, so that a driving current output by the output circuit is irrelevant to the threshold voltage of the switching element electrically coupled to the first control terminal of the output circuit, thereby improving the detection uniformity and accuracy of the pixel circuit.

Additional aspects and advantages of the present application will be given in the following description, which will become apparent from the following description, or be understood through practice of the present application.

BRIEF DESCRIPTION OF THE DRAWINGS

The foregoing and/or additional aspects and advantages of the present application will become apparent and easy to understand from the following description of the embodiments in conjunction with the accompanying drawings, in which:

FIG. 6 is a flowchart of a method for driving a pixel circuit according to an embodiment of the present application.

| Reference numerals: | |
|---|---|
| 10-pixel circuit; | 100-charge storage circuit; |
| 210-first reset circuit; | 220-second reset circuit; |
| 230-third reset circuit; | 300-photosensitive control circuit; |
| 310-first switch circuit; | 320-second switch circuit; |
| 400-output circuit; | 410-first driving circuit; |
| 420-second driving circuit; | 500-amplifying circuit; |
| T1-first switch element; | T2-second switch element; |
| T3-third switch element; | T4-fourth switch element; |
| T5-fifth switch element; | T6-sixth switch element; |
| Msf-seventh switch element; | T7-eighth switch element; |
| C1-capacitor; | N1-first node; |

| -continued | |
|---|---|
| Reference numerals: | |
| N2-second node; | RST-reset control signal line; |
| Vref-reference signal line; | $V_{init1}$-first initialization signal line; |
| Vinit2-second initialization signal line; | Read-scanning signal line; |
| Read Line-reading signal line; | Gate-gate signal line; |
| VDD-first level terminal; | Vbias2-second level terminal; |
| Vbias1-third level terminal; | $V_{DD}$-first level; |
| $V_{ref}$-reference level; | $V_{init2}$-second initialization voltage; |
| $V_{th}$-threshold voltage; | $V_{pin}$-induced level; |
| $I_{ds}$-driving current. | |

DETAILED DESCRIPTION

The present disclosure is described in detail below. Examples of embodiments of the present disclosure are shown in the drawings, where the same or similar reference numerals indicate the same or similar components or components having the same or similar functions. Further, if detailed descriptions of known technologies are unnecessary for the illustrated features of the present disclosure, they are omitted. The embodiments described below with reference to the drawings are exemplary, and only used to explain the present disclosure, and cannot be construed as limiting the present disclosure.

It will be understood by those skilled in the art that, unless otherwise defined, all terms (including technical and scientific terms) used herein have the same meaning as commonly understood by one of ordinary skill in the art to which this disclosure belongs. It should also be understood that terms such as those defined in the general dictionary should be understood to have meanings consistent with the meanings in the context of the conventional technologies, and unless specifically defined herein, they would not be explained by idealized or overly formal meanings.

Those skilled in the art will understand that, unless specifically stated, otherwise, the singular forms of "a", "an", "the" and "said" may include plural forms. It should be further understood that the wording "including" used in the specification of the present disclosure refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it may be directly connected or coupled to the another element, or an intervening element may also be present. Furthermore, "connected" or "coupled" as used herein may include wireless connection or wireless coupling. The term "and/or" as used herein includes all or any of or all combinations of one or more of associated items as listed.

Figure 1:
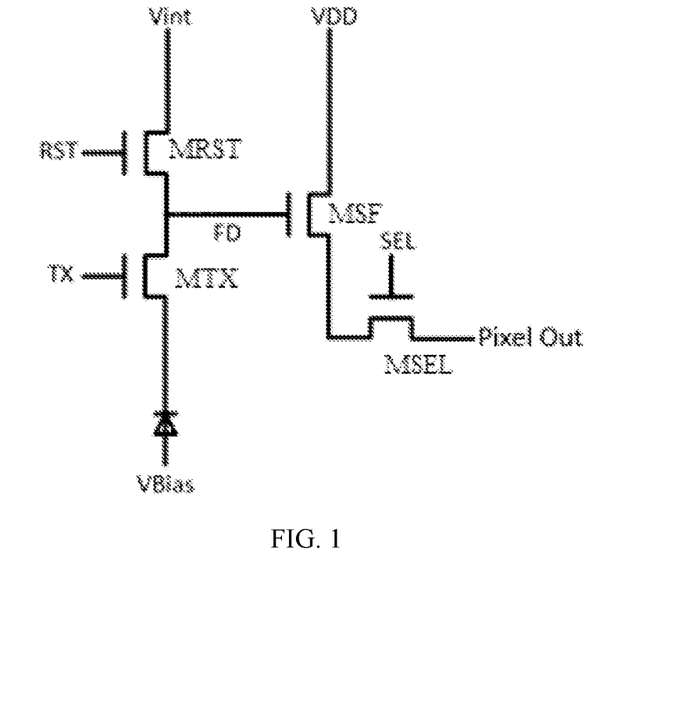
FIG. 1 is a schematic structural diagram of a pixel circuit in the related art provided in the present application.

The inventors of the present application discover through research that, as shown in FIG. 1, in 4T-APS active pixel circuit structure in the related art, the 4T-APS pixel circuit structure is composed of a pinned-photodiode (PPD), a transmission transistor MTX, a reset transistor MRST, a source follower MSF and a row switch transistor MSEL. The characteristic of such 4T-APS pixel circuit structure is that the transmission transistor MTX can effectively reduce thermal noise and dark current of pixels, and the source follower MSF acts as a buffer and amplifier, which can amplify a current generated by the photodiode and output it.

Figure 2:
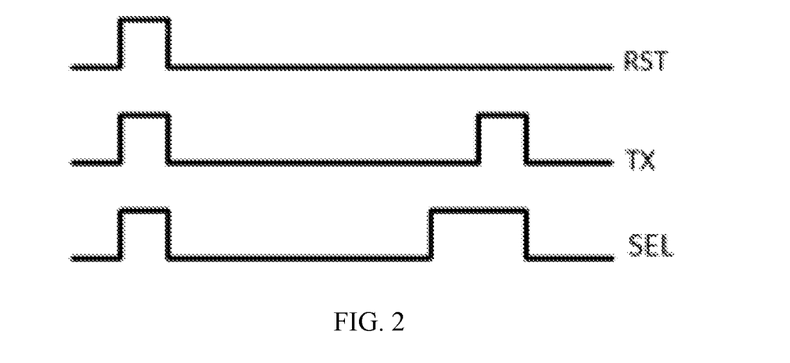
FIG. 2 is a working timing diagram of a pixel circuit in the related art provided in the present application.

As shown in FIG. 2, a working timing of the 4T-APS pixel circuit structure may be divided into three stages including a reset stage, an integration stage, and a transfer stage. In the reset stage, a reset signal RST=1, TX=1, the reset transistor MRST and the transmission transistor MTX are turned on, and the photodiode is reset and clamped to prepare for collection of photo-generated charges. In the integration stage, RST=0, TX=0, the reset transistor MRST and the transmission transistor MTX are turned off, and the photo-generated charge is collected by the photodiode, SEL=1, the row switch transistor MRST is turned on, a reset signal of the FD point is output to a column line through the source follower MSF, that is, the pixel in the reset stage outputs a voltage. In the transfer stage, TX=1, the transmission transistor MTX is turned on, the photo-generated charges accumulated at the photodiode are transferred to the FD point to convert a charge signal into a voltage signal, and a voltage at the FD point (i.e., a voltage in the integration stage) is again output to the column line through the source follower MSF.

Ideally, a voltage Vout at an output end of the source follower MSF linearly follows a voltage change at the FD point. However, due to body effect and uniformity of a metal oxide semiconductor (MOS) or a thin film transistor (TFT), an output voltage or current does not have an ideal linear relationship. The output voltage and current of the MSF are related to a threshold voltage of the source follower MSF. Improving uniformity of the threshold voltage of the source follower MSF helps to reduce output nonlinearity caused by changes of the threshold voltage of the source follower MSF.

Figure 3:
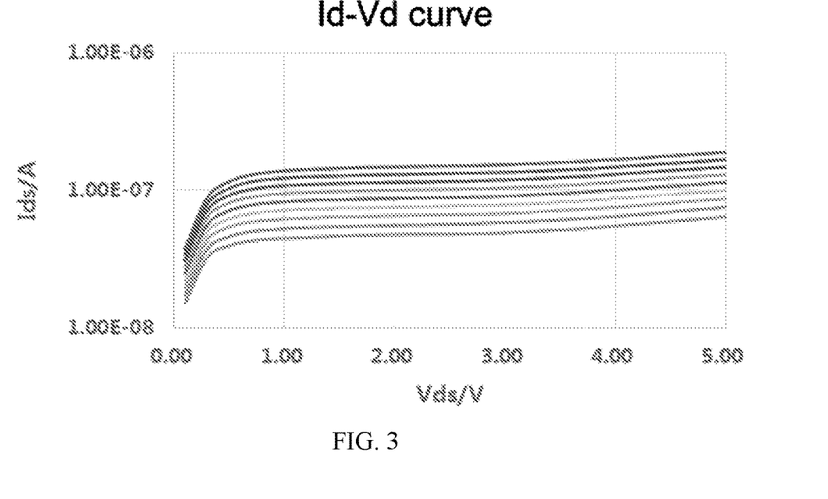
FIG. 3 shows an output characteristic curve of a TFT provided in the present application.

Referring to FIG. 3, which shows output characteristic curves of the TFT, under different source-drain voltages $V_{gs}$, driving currents $I_{ds}$ of the TFT are different. For a TFT array, there are differences in uniformity of different TFTs. Due to the differences in the uniformity of the TFTs, under the same $V_{gs}$, there will also be differences in output driving currents $I_{ds}$ of the TFTs. Therefore, by using a circuit to compensate for a threshold voltage $V_{th}$ of the TFT is a necessary means to improve the output nonlinearity.

The pixel circuit, photoelectric detection substrate, photoelectric detection device and driving method provided in the present application are intended to solve the above technical problems in the related art.

The technical solutions of the present application and how the technical solutions of the present application solve the above technical problems will be described in detail hereinafter with specific embodiments.

Figure 4:
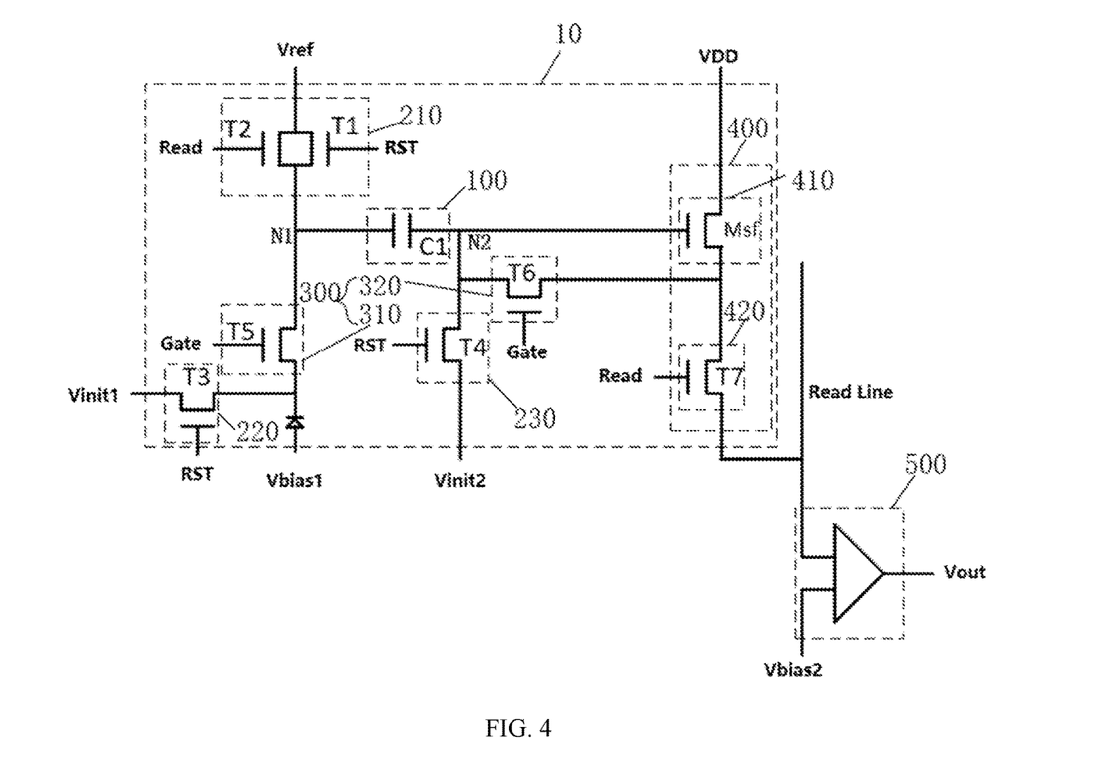
FIG. 4 is a schematic structural diagram of a pixel circuit electrically coupled to an amplifying circuit according to an embodiment of the present application.

One embodiment of the present application provides a pixel circuit 10. As shown in FIG. 4, the pixel circuit 10 includes: a charge storage circuit 100, a reset circuit, a photosensitive control circuit 300 and an output circuit 400.

A first terminal and a second terminal of the charge storage circuit 100 are electrically coupled to a first node N1 and a second node N2, respectively.

A first control terminal of the reset circuit is electrically coupled to a reset control signal line RST. A second control terminal of the reset circuit is electrically coupled to a scan signal line Read. A first terminal, a second terminal and a third terminal of the reset circuit are electrically coupled to a reference signal line Vref, a first initialization signal line Vinit1, and a second initialization signal line Vinit2, respectively. A fourth terminal, a fifth terminal, and a sixth terminal of the reset circuit are electrically coupled to the first node N1, a photodiode of the pixel circuit 10 and the second node N2, respectively.

A control terminal of the photosensitive control circuit 300 is electrically coupled to a gate signal line Gate. A first terminal, a second terminal and a third terminal of the photosensitive control circuit 300 are electrically coupled to the photodiode, the first node N1 and the second node N2, respectively.

A first control terminal of the output circuit 400 is electrically coupled to the second node N2. A second control terminal of the output circuit 400 is electrically coupled to the scan signal line Read. A first terminal and a second terminal of the output circuit 400 are electrically coupled to a first level terminal and a fourth terminal of the photosensitive control circuit 300, respectively.

The pixel circuit 10 of the embodiment of the present application can compensate a threshold voltage of a switching element electrically coupled to the first control terminal of the output circuit 400, so that a driving current output by the output circuit 400 is irrelevant to the threshold voltage of the switching element electrically coupled to the first control terminal of the output circuit 400. Further, in the embodiment of the present application, a quiescent operating point of the switching element electrically coupled to the first control terminal of the output circuit 400 is adjusted by selecting a reference level of the reference signal line Vref electrically coupled to the first terminal of the reset circuit, thereby improving the detection uniformity and accuracy of the pixel circuit 10.

Optionally, referring to FIG. 4, a fifth terminal of the photosensitive control circuit 300 is electrically coupled to a cathode of the photodiode. The first terminal of the photosensitive control circuit 300 is electrically coupled to the cathode of the photodiode. An anode of the photodiode is electrically coupled to a third level terminal Vbias1.

Optionally, the fifth terminal of the photosensitive control circuit 300 may also be electrically coupled to the anode of the photodiode; the first terminal of the photosensitive control circuit 300 is electrically coupled to the anode of the photodiode, and the cathode of the photodiode is electrically coupled to the third level terminal Vbias1.

Optionally, the charge storage circuit 100 includes a capacitor C1.

In some embodiments, the reset circuit includes a first reset circuit 210, a second reset circuit 220, and a third reset circuit 230. Control terminals of the second reset circuit 220 and the third reset circuit 230 and a first control terminal of the first reset circuit 210 collectively serve as the first control terminal of the reset circuit. A second control terminal of the first reset circuit 210 serves as the second control terminal of the reset circuit.

A first terminal and a second terminal of the first reset circuit 210 serve as the first terminal and the fourth terminal of the reset circuit, respectively. A first terminal and a second terminal of the second reset circuit 220 serve as the second terminal and the fifth terminal of the reset circuit, respectively. A first terminal and a second terminal of the third reset circuit 230 serve as the third terminal and the sixth terminal of the reset circuit, respectively.

In some embodiments, the photosensitive control circuit 300 includes a first switch circuit 310 and a second switch circuit 320.

Control terminals of the first switch circuit 310 and the second switch circuit 320 collectively serve as the control terminal of the photosensitive control circuit 300.

A first terminal and a second terminal of the first switch circuit 310 serve as the first terminal and the second terminal of the photosensitive control circuit 300 respectively. A first terminal and the second terminal of the second switch circuit 320 serve as the third terminal and the fourth terminal of the photosensitive control circuit 300 respectively.

In some embodiments, the output circuit 400 includes a first driving circuit 410 and a second driving circuit 420.

A control terminal and a first terminal of the first driving circuit 410 serve as the first control terminal and the first terminal of the output circuit 400 respectively. A second terminal of the first driving circuit 410 and a first terminal of the second driving circuit 420 together serve as the second terminal of the output circuit 400. A control terminal and a second terminal of the second driving circuit 420 serve as the second control terminal and the third terminal of the output circuit 400, respectively.

In some embodiments, the first reset circuit 210 includes a first switch element T1 and a second switch element T2.

A control terminal of the first switch element T1 and a control terminal of the second switch element T2 serve as the first control terminal and the second control terminal of the first reset circuit 210, respectively. A first terminal of the first switch element T1 and a first terminal of the second switch element T2 together serve as the first terminal of the first reset circuit 210. A second terminal of the first switch element T1 and a second terminal of the second switch element T2 together serve as the second terminal of the first reset circuit 210.

In some embodiments, the second reset circuit 220 includes a third switch element T3. A control terminal, a first terminal and a second terminal of the third switch element T3 serve as the control terminal, the first terminal and the second terminal of the second reset circuit 220, respectively.

The third reset circuit 230 includes a fourth switch element T4. A control terminal, a first terminal and a second terminal of the fourth switch element T4 serve as the control terminal, the first terminal and the second terminal of the third reset circuit 230, respectively.

In some embodiments, the first switch circuit 310 includes a fifth switch element T5. A control terminal, a first terminal and a second terminal of the fifth switch element T5 serve as the control terminal, the first terminal and the second terminal of the first switch circuit 310, respectively.

The second switch circuit 320 includes a sixth switch element T6. A control terminal, a first terminal and a second terminal of the sixth switch element T6 serve as the control terminal, the first terminal and the second terminal of the second switch circuit 320, respectively.

In some embodiments, the first driving circuit 410 includes a seventh switch element Msf. A control terminal, a first terminal and a second terminal of the seventh switch element Msf serve as the control terminal, the first terminal and the second terminal of the first driving circuit 410, respectively.

The second driving circuit 420 includes an eighth switch element T7. A control terminal, a first terminal and a second terminal of the eighth switch element T7 serve as the control terminal, the first terminal and the second terminal of the second driving circuit 420, respectively.

Optionally, each switch element is a thin film transistor, and a control terminal of any switch element is a gate electrode of the thin film transistor; if a first terminal of the switch element is a source electrode of the thin film transistor, a second terminal of the switch element is a drain electrode of the thin film transistor. If the first terminal of the switch element is the drain electrode of the thin film transistor, the second terminal of the switch element is the source electrode of the thin film transistor.

Those skilled in the art can understand that when each thin film transistor is a P-type TFT or an N-type TFT, or the first terminal and the second terminal of each transistor are different electrodes of the TFT, electrical connections of various elements in the pixel circuit provided in the embodiment of the present application can be adjusted adaptively, and the electrical connections after the adaptive adjustment still belong to the protection scope of the embodiment of the present application.

Figure 5:
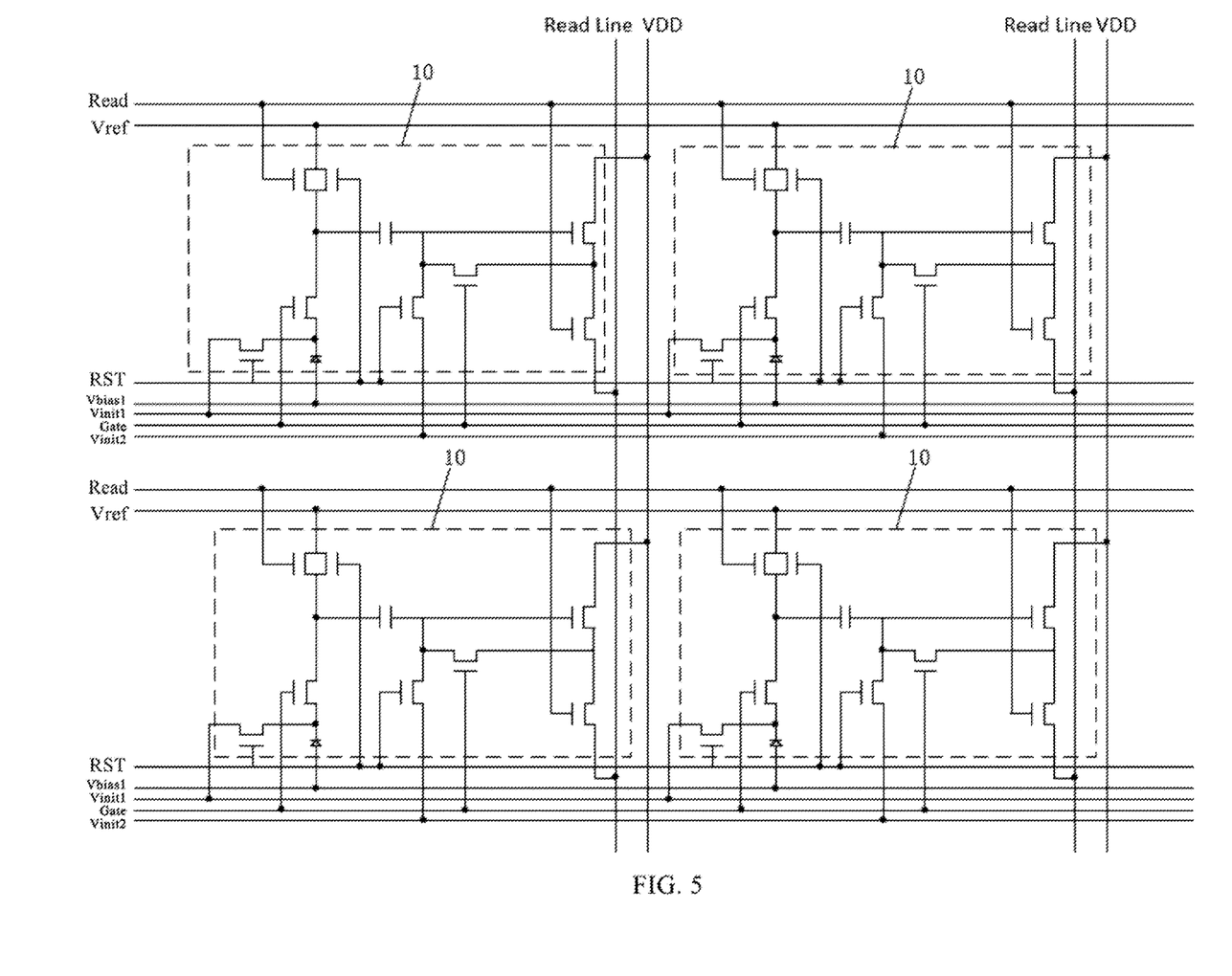
FIG. 5 is a schematic structural diagram of a photoelectric detection substrate according to an embodiment of the present application.

Based on the same inventive concept, one embodiment of the present application provides a photoelectric detection substrate. As shown in FIG. 5, the photoelectric detection substrate includes: multiple reset control signal lines RST, multiple scan signal lines Read, multiple reference signal lines Vref, multiple first initialization signal lines Vinit1, multiple second initialization signal lines Vinit2, multiple gate signal lines Gate, and an array of pixel circuits 10 of any embodiment of the present application.

The first control terminal of the reset circuit of each pixel circuit 10 is electrically coupled to a reset control signal line RST; the second control terminal of the reset circuit of each pixel circuit 10 is electrically coupled to a scan signal line Read. A first terminal, a second terminal and a third terminal of the reset circuit of each pixel circuit 10 are electrically coupled to a reference signal line Vref, a first initialization signal line Vinit1, and a second initialization signal line Vinit2, respectively.

The control terminal of the photosensitive control circuit 300 of each pixel circuit 10 is electrically coupled to a gate signal line Gate.

The second control terminal of the output circuit 400 of each pixel circuit 10 is electrically coupled to a scanning signal line Read.

In some embodiments, as shown in FIG. 4, the photoelectric detection substrate further includes multiple amplifying circuits 500.

The third terminal of the output circuit 400 of each pixel circuit 10 is electrically coupled to a first terminal of one amplifier circuit 500.

Optionally, one amplifying circuit 500 may be shared by multiple pixel circuits 10. In some application examples, the amplifying circuit 500 and the pixel circuit 10 are fabricated on an identical substrate (glass, silicon). In some application examples, the amplifying circuit 500 and the pixel circuit 10 may be fabricated on different substrates, respectively, and they may be connected together by bonding.

In some embodiments, a second terminal of the amplifying circuit 500 is electrically coupled to the second level terminal Vbias2, and a third terminal of the amplifying circuit 500 is configured to output an amplified output current. An output voltage of the third terminal of the amplifying circuit 500 is Vout.

Optionally, signals processed by the amplifying circuit 500 may be sent to an image processing circuit. The image processing circuit has functions of image recognition processing. Therefore, the photoelectric detection substrate of the embodiment of the present application has a wide range of applications in the fields of photography, fingerprint identification, palm print identification, etc.

In some embodiments, the reference signal line Vref, the first initialization signal line Vinit1 and the second initialization signal line Vinit2 electrically coupled to one identical pixel circuit 10 are one identical signal line.

Optionally, the third terminal of the output circuit 400, that is, the second terminal of the second driving circuit 420, and the second terminal of the eighth switch element T7 are electrically coupled to the first terminal of the amplifying circuit 500 through the read signal line Read Line.

Optionally, as shown in FIG. 5, the pixel circuits 10 in one identical row are electrically coupled to one identical reset control signal line RST; the pixel circuits 10 in one identical row are electrically coupled to one identical reference signal line Vref; the pixel circuits 10 in one identical row are electrically coupled to one identical first initialization signal line Vinit1; the pixel circuits 10 in one identical row are electrically coupled to one identical second initialization signal line Vinit2; the pixel circuits 10 in one identical row are electrically coupled to one identical gate signal line Gate; the pixel circuits 10 in one identical row are electrically coupled to one identical scan signal line Read.

Optionally, as shown in FIG. 5, the pixel circuits 10 in one identical column are electrically coupled to one identical read signal line Read Line; the pixel circuits 10 in one identical column are electrically coupled to one identical first level terminal VDD.

Based on the same inventive concept, one embodiment of the present application provides a photoelectric detection device, which includes the pixel circuit 10 of any embodiment of the present application or the photoelectric detection substrate of any embodiment of the present application.

Based on the same inventive concept, one embodiment of the present application provides a driving method applied to the pixel circuit 10 of any embodiment of the present application. As shown in FIG. 4 and FIG. 6, the driving method of the pixel circuit 10 includes the following steps S601 to S603.

Step S601: in a reset stage, the first terminal and the fourth terminal of the reset circuit are in a conducting state, the second terminal and the fifth terminal of the reset circuit are in a conducting state, the third terminal and the sixth terminal of the reset circuit are in a conducting state, and the first terminal and the second terminal of the output circuit 400 are in a conducting state, thereby writing the reference level $V_{ref}$ to the first node N1, and initializing levels of the photodiode and the second node N2.

Optionally, the first control terminal of the reset circuit receives a first level signal, the first terminal and the fourth terminal of the reset circuit are in a conducting state, the second terminal and the fifth terminal of the reset circuit are in a conducting state, and the third terminal and the sixth terminal of the reset circuit are in a conducting state, and the first terminal and the second terminal of the output circuit 400 are in a conducting state.

Step S602: in a photosensitive stage, the first terminal and the fourth terminal of the reset circuit are in a disconnected state, the second terminal and the fifth terminal of the reset circuit are in a disconnected state, the third terminal and the sixth terminal of the reset circuit are in a disconnected state, the first terminal and the second terminal of the photosensitive control circuit 300 are in a conducting state, and the third terminal and the fourth terminal of the photosensitive control circuit 300 are in a conducting state, thereby writing an induced level $V_{pin}$ generated by induced charges of the photodiode into the first node N1, and writing a threshold voltage $V_{th}$ of the switch element electrically coupled to the first control terminal of the output circuit 400 and the first level $V_{DD}$ of the first level terminal VDD into the second node N2.

Optionally, in the photosensitive stage, the first control terminal of the reset circuit receives a second level signal, thereby enabling the first terminal and the fourth terminal of the reset circuit to be in a disconnected state, enabling the second terminal and the fifth terminal of the reset circuit to be in a disconnected state, and enabling the third terminal and the sixth terminal of the reset circuit to be in a disconnected state.

Optionally, in the photosensitive stage, the control terminal of the photosensitive control circuit 300 receives the first level signal, thereby enabling the first terminal and the second terminal of the photosensitive control circuit 300 to be in a conducting state, and enabling the third terminal and the fourth terminal of the photosensitive control circuit 300 to be in a conducting state.

Step S603: in a reading phase, the first terminal and the second terminal of the photosensitive control circuit 300 are in a disconnected state, the third terminal and the fourth terminal of the photosensitive control circuit 300 are in a disconnected state; the first terminal and the fourth terminal of the reset circuit are in a conducting state, the first terminal and the third terminal of the output circuit 400 are in a conducting state; under action of the charge storage circuit 100, the level of the second node N2 becomes a driving level, thereby enabling the third terminal of the output circuit 400 to output a driving current $I_{ds}$; the driving level is generated based on the induced level $V_{pin}$ and a sum of the threshold voltage, the first level $V_{DD}$ and the reference level.

Optionally, the control terminal of the photosensitive control circuit 300 receives the second level signal, thereby enabling the first terminal and the second terminal of the photosensitive control circuit 300 to be in a disconnected state, and enabling the third terminal and the fourth terminal of the photosensitive control circuit 300 to be in a disconnected state. The second control terminal of the output circuit 400 and the second control terminal of the reset circuit receive the first level signal, thereby enabling the first terminal and the fourth terminal of the reset circuit to be in a conducting state, and enabling the first terminal and the third terminal of the output circuit 400 to be in a conducting state.

Figure 7:
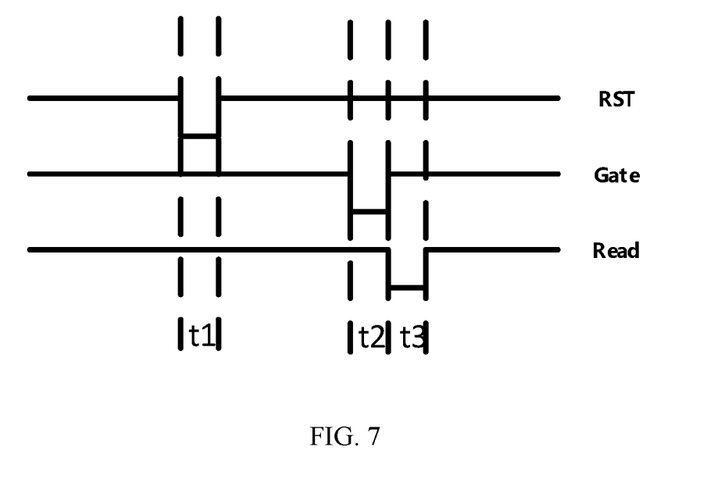
FIG. 7 is a working timing diagram of a pixel circuit according to an embodiment of the present application.

As an example of the embodiment of the present application, referring to FIG. 4 and FIG. 7, based on the pixel structure 10 of the embodiment of the present application, by taking the switch element being a P-type TFT as an example, the driving method of the pixel circuit 10 of the embodiment of the present application will be described in detail. The method includes the following steps:

Reset stage: corresponding to t1 stage, an RST signal output by the reset control signal line RST is low level, the first switch element T1, the third switch element T3 and the fourth switch element T4 are turned on, thereby resetting the photodiode, the first node N1 and the second node N2, writing the reference level $Vr_{ef}$ into the first node N1 and writing the second initialization voltage $V_{init2}$ into the second node N2;

Photosensitive stage: corresponding to t2 stage, a Gate signal output by the gate signal line Gate is low level, the fifth switch element T5 and the sixth switch element T6 are turned on, thereby writing an induced level $V_{pin}$ generated by induced charges of the photodiode into the first node N1, and writing a threshold voltage $V_{th}$ and the first level $V_{DD}$ into the second node N2;

Reading stage: corresponding to t3 stage, a Read signal output by the scan signal line Read is low level, the second switch element T2 and the eighth switch element T7 are turned on, and the voltage of the first node N1 changes from the induced level $V_{pin}$ to the reference voltage level $V_{ref}$; the second node N2 is coupled by the first node N1, and the voltage of the second node N2 changes from VDD+Vth to VDD+Vth+Vref−Vpin; the current of the seventh switch element Msf is output to the peripheral amplifying circuit 500 through the eighth switch element T7, and undergoes arithmetic processing to realize function of image recognition.

Optionally, the driving current $I_{ds}$ may be represented with the following expression (1):

$$I_{ds}=0.5*\mu*Cox*W/L(V_{gs}-V_{th})^2 \qquad \text{expression (1)};$$

In the expression (1), $I_{ds}$ represents a drain-source current of the TFT, μ represents a carrier mobility, Cox represents an oxide capacitance, W represents a channel width of the TFT, L represents a channel length of the TFT, $V_{gs}$ represents a gate-source voltage of the TFT, and the value of $V_{gs}$ is equal to a gate level $V_g$ minus a source level $V_s$.

Correspondingly, in the reading phase (the t3 phase), the driving current $I_{ds}$ may be expressed with the following expression (2):

$$I_{ds}=0.5*\mu*Cox*W/L(V_{DD}+V_{th}+V_{ref}-V_{pin}-V_{DD}-V_{th})^2 \quad \text{expression (2)};$$

In the expression (2), the gate level $V_g=V_{DD}+V_{th}+V_{ref}-V_{pin}$, and the source level $V_s=V_{DD}$.

A final driving current $I_{ds}$ obtained based on expression (2) may be expressed with the following expression (3):

$$I_{ds}=0.5*\mu*Cox*W/L(V_{ref}-V_{pin})^2 \qquad \text{expression (3)};$$

According to the driving current $I_{ds}$ represented by the expression (3), it can be known that the pixel circuit 10 causes the driving current $I_{ds}$ output by the third terminal of the output circuit 400 to be irrelevant to the threshold voltage of the first driving circuit, that is, the driving current $I_{ds}$ output by the third terminal of the output circuit 400 has no relation to the threshold voltage of the seventh switch element Msf Therefore, differences in the output current of the seventh switch element Msf caused by differences in the threshold voltages Vth of the TFTs can be excluded.

Those skilled in the art can understand that steps, measures, or solutions in various operations, methods or processes that have been discussed in the present disclosure may be alternated, changed, combined, or deleted. Further, other steps, measures, or solutions in various operations, methods or processes that have been discussed in the present disclosure can be alternated, modified, rearranged, decomposed, combined, or deleted. Further, steps, measures, or solutions in various operations, methods or processes in the conventional technologies can be alternated, modified, rearranged, decomposed, combined, or deleted.

In the descriptions of the present disclosure, it needs to be understood that orientation or positional relationship indicated by the term of "center", "up", "down", "front", "rear", "left", "right", "vertical", "horizontal", "top", "bottom", "inside", or "outer", etc., is based on the drawings, and are only for the convenience of describing the present disclosure and simplifying the description, and not intended to indicate or imply that the device or element as referred to must have a specific orientation or be constructed and operated in a specific orientation, and therefore cannot be understood as a limitation to the present disclosure.

The terms "first" and "second" are used for descriptive purposes only, and cannot be understood as indicating or implying relative importance or implicitly indicating the quantity of technical features as referred to. Therefore, the features defined by "first" and "second" may explicitly or implicitly include one or more of the features. In the descriptions of the present disclosure, unless otherwise stated, "a plurality" means two or more.

In the description of the present disclosure, it should be noted that the term of "installation", "connected", or "connecting" should be understood in a broad sense unless explicitly stated and limited. For example, it may be fixed or removable connection, or may be integral connection; it may be direct connection or indirect connection through an intermediate medium, or, it may be internal communication of two elements. For those of ordinary skill in the art, the specific meanings of the above terms in the present disclosure may be understood on a case-by-case basis.

In the descriptions of this specification, specific features, structures, materials, or characteristics may be combined in a suitable manner in any one or more embodiments or examples.

It should be understood that although the steps in the flowchart of the drawings are sequentially displayed in accordance with the directions of the arrows, these steps are not necessarily performed in the order indicated by the arrows. Unless explicitly stated herein, the execution of these steps is not strictly limited, and they may be performed in other orders. Moreover, at least a part of the steps in the flowchart of the drawings may include multiple sub-steps or multiple stages. These sub-steps or stages are not necessarily performed at the same time, but may be performed at different times; and they are not necessarily performed sequentially, but may be performed in turn or alternately with other steps or at least a part of sub-steps or stages of other steps.

The above descriptions are merely some embodiments of the present disclosure. It should be noted that for those of ordinary skill in the art, without departing from the principles of the present disclosure, various improvements and modifications can be made. These improvements and modifications should fall within the protection scope of the present disclosure.

What is claimed is:

1. A pixel circuit, comprising:
a charge storage circuit, wherein a first terminal and a second terminal of the charge storage circuit are electrically coupled to a first node and a second node, respectively;
a reset circuit, wherein a first control terminal of the reset circuit is electrically coupled to a reset control signal line, a second control terminal of the reset circuit is electrically coupled to a scan signal line; a first terminal, a second terminal and a third terminal of the reset circuit are electrically coupled to a reference signal line, a first initialization signal line, and a second initialization signal line, respectively, a fourth terminal, a fifth terminal, and a sixth terminal of the reset circuit are electrically coupled to the first node, a photodiode of the pixel circuit and the second node, respectively;
a photosensitive control circuit, wherein a control terminal of the photosensitive control circuit is electrically coupled to a gate signal line; a first terminal, a second terminal and a third terminal of the photosensitive control circuit are electrically coupled to the photodiode, the first node and the second node, respectively; and
an output circuit, wherein a first control terminal of the output circuit is electrically coupled to the second node, a second control terminal of the output circuit is electrically coupled to a scan signal line, a first terminal and a second terminal of the output circuit are electrically coupled to a first level terminal and a fourth terminal of the photosensitive control circuit, respectively,
wherein the reset circuit includes a first reset circuit, a second reset circuit, and a third reset circuit;
control terminals of the second reset circuit and the third reset circuit and a first control terminal of the first reset circuit collectively serve as the first control terminal of the reset circuit;

a second control terminal of the first reset circuit serves as the second control terminal of the reset circuit;

a first terminal and a second terminal of the first reset circuit serve as the first terminal and the fourth terminal of the reset circuit, respectively;

a first terminal and a second terminal of the second reset circuit serve as the second terminal and the fifth terminal of the reset circuit, respectively;

a first terminal and a second terminal of the third reset circuit serve as the third terminal and the sixth terminal of the reset circuit, respectively.

2. The pixel circuit according to claim 1, wherein the photosensitive control circuit includes a first switch circuit and a second switch circuit;

control terminals of the first switch circuit and the second switch circuit collectively serve as the control terminal of the photosensitive control circuit;

a first terminal and a second terminal of the first switch circuit serve as the first terminal and the second terminal of the photosensitive control circuit, respectively;

a first terminal and a second terminal of the second switch circuit serve as the third terminal and the fourth terminal of the photosensitive control circuit, respectively.

3. The pixel circuit according to claim 1, wherein the output circuit includes a first driving circuit and a second driving circuit;

a control terminal and a first terminal of the first driving circuit serve as the first control terminal and the first terminal of the output circuit, respectively;

a second terminal of the first driving circuit and a first terminal of the second driving circuit together serve as the second terminal of the output circuit;

a control terminal and a second terminal of the second driving circuit serve as the second control terminal and the third terminal of the output circuit, respectively.

4. The pixel circuit according to claim 1, wherein the first reset circuit includes a first switch element and a second switch element;

a control terminal of the first switch element and a control terminal of the second switch element serve as the first control terminal and the second control terminal of the first reset circuit, respectively;

a first terminal of the first switch element and a first terminal of the second switch element together serve as the first terminal of the first reset circuit;

a second terminal of the first switch element and a second terminal of the second switch element together serve as the second terminal of the first reset circuit.

5. The pixel circuit according to claim 1, wherein the second reset circuit includes a third switch element;

a control terminal, a first terminal and a second terminal of the third switch element serve as the control terminal, the first terminal and the second terminal of the second reset circuit, respectively;

the third reset circuit includes a fourth switch element;

a control terminal, a first terminal and a second terminal of the fourth switch element serve as the control terminal, the first terminal and the second terminal of the third reset circuit, respectively.

6. The pixel circuit according to claim 2, wherein the first switch circuit includes a fifth switch element;

a control terminal, a first terminal and a second terminal of the fifth switch element serve as the control terminal, the first terminal and the second terminal of the first switch circuit, respectively;

the second switch circuit includes a sixth switch element;

a control terminal, a first terminal and a second terminal of the sixth switch element serve as the control terminal, the first terminal and the second terminal of the second switch circuit, respectively.

7. The pixel circuit according to claim 3, wherein the first driving circuit includes a seventh switch element;

a control terminal, a first terminal and a second terminal of the seventh switch element serve as the control terminal, the first terminal and the second terminal of the first driving circuit, respectively;

the second driving circuit includes an eighth switch element;

a control terminal, a first terminal and a second terminal of the eighth switch element serve as the control terminal, the first terminal and the second terminal of the second driving circuit, respectively.

8. A photoelectric detection substrate, comprising:

a plurality of reset control signal lines;

a plurality of scan signal lines;

a plurality of reference signal lines;

a plurality of first initialization signal lines;

a plurality of second initialization signal lines;

a plurality of gate signal lines; and an array of pixel circuits;

wherein each pixel circuit comprises: a charge storage circuit, a reset circuit, a photosensitive control circuit, and an output circuit; a first terminal and a second terminal of the charge storage circuit are electrically coupled to a first node and a second node, respectively; a first control terminal of the reset circuit is electrically coupled to a reset control signal line, a second control terminal of the reset circuit is be electrically coupled to a scan signal line; a first terminal, a second terminal and a third terminal of the reset circuit are electrically coupled to a reference signal line, a first initialization signal line, and a second initialization signal line, respectively; a fourth terminal, a fifth terminal, and a sixth terminal of the reset circuit are electrically coupled to the first node, a photodiode of the pixel circuit and the second node, respectively; a control terminal of the photosensitive control circuit is electrically coupled to a gate signal line; a first terminal, a second terminal and a third terminal of the photosensitive control circuit are electrically coupled to the photodiode, the first node and the second node, respectively; a first control terminal of the output circuit is electrically coupled to the second node, a second control terminal of the output circuit is electrically coupled to a scan signal line; a first terminal and a second terminal of the output circuit are electrically coupled to a first level terminal and a fourth terminal of the photosensitive control circuit, respectively;

the first control terminal of the reset circuit of each pixel circuit is electrically coupled to one reset control signal line; the second control terminal of the reset circuit of each pixel circuit is electrically coupled to one scan signal line; the first terminal, the second terminal and the third terminal of the reset circuit of each pixel circuit are electrically coupled to one reference signal line, one first initialization signal line, and one second initialization signal line, respectively;

the control terminal of the photosensitive control circuit of each pixel circuit is electrically coupled to one gate signal line;

the second control terminal of the output circuit of each pixel circuit is electrically coupled to one scanning signal line,
wherein the reference signal line, the first initialization signal line and the second initialization signal line electrically coupled to one identical pixel circuit are one identical signal line.

9. The photoelectric detection substrate according to claim 8, wherein the photoelectric detection substrate further includes a plurality of amplifying circuits;
a third terminal of the output circuit of each pixel circuit is electrically coupled to a first terminal of one amplifier circuit;
a second terminal of the amplifying circuit is electrically coupled to a second level terminal, and a third terminal of the amplifying circuit is configured to output an amplified output current.

10. The photoelectric detection substrate according to claim 9, wherein the photoelectric detection substrate further includes a substrate; the amplifying circuit and the pixel circuit are on the substrate.

11. The photoelectric detection substrate according to claim 9, wherein the photoelectric detection substrate further includes a first substrate and a second substrate; the pixel circuit is on the first substrate; and the amplifying circuit is on the second substrate.

12. The photoelectric detection substrate according to claim 8, wherein the pixel circuits in one identical row are electrically coupled to one identical reset control signal line; the pixel circuits in one identical row are electrically coupled to one identical reference signal line; the pixel circuits in one identical row are electrically coupled to one identical first initialization signal line; the pixel circuits in one identical row are electrically coupled to one identical second initialization signal line; the pixel circuits in one identical row are electrically coupled to one identical gate signal line; the pixel circuits in one identical row are electrically coupled to one identical scan signal line.

13. The photoelectric detection substrate according to claim 12, wherein the pixel circuits in one identical column are electrically coupled to one identical read signal line;
the pixel circuits in one identical column are electrically coupled to one identical first level terminal.

14. The photoelectric detection substrate according to claim 8, wherein the reset circuit includes a first reset circuit, a second reset circuit, and a third reset circuit;
control terminals of the second reset circuit and the third reset circuit and a first control terminal of the first reset circuit collectively serve as the first control terminal of the reset circuit;
a second control terminal of the first reset circuit serves as the second control terminal of the reset circuit;
a first terminal and a second terminal of the first reset circuit serve as the first terminal and the fourth terminal of the reset circuit, respectively;
a first terminal and a second terminal of the second reset circuit serve as the second terminal and the fifth terminal of the reset circuit, respectively;
a first terminal and a second terminal of the third reset circuit serve as the third terminal and the sixth terminal of the reset circuit, respectively.

15. The photoelectric detection substrate according to claim 8, wherein the photosensitive control circuit includes a first switch circuit and a second switch circuit;
control terminals of the first switch circuit and the second switch circuit collectively serve as the control terminal of the photosensitive control circuit;

a first terminal and a second terminal of the first switch circuit serve as the first terminal and the second terminal of the photosensitive control circuit, respectively;
a first terminal and a second terminal of the second switch circuit serve as the third terminal and the fourth terminal of the photosensitive control circuit, respectively.

16. The photoelectric detection substrate according to claim 8, wherein the output circuit includes a first driving circuit and a second driving circuit;
a control terminal and a first terminal of the first driving circuit serve as the first control terminal and the first terminal of the output circuit, respectively;
a second terminal of the first driving circuit and a first terminal of the second driving circuit together serve as the second terminal of the output circuit;
a control terminal and a second terminal of the second driving circuit serve as the second control terminal and the third terminal of the output circuit, respectively.

17. A photoelectric detection device, comprising: the photoelectric detection substrate according to claim 8.

18. A driving method applied to the pixel circuit according to claim 1, comprising:
in a reset stage, controlling the first terminal and the fourth terminal of the reset circuit to be in a conducting state, controlling the second terminal and the fifth terminal of the reset circuit to be in a conducting state, controlling the third terminal and the sixth terminal of the reset circuit to be in a conducting state, controlling the first terminal and the second terminal of the output circuit to be in a conducting state, writing a reference level to the first node, and initializing levels of the photodiode and the second node;
in a photosensitive stage, controlling the first terminal and the fourth terminal of the reset circuit to be in a disconnected state, controlling the second terminal and the fifth terminal of the reset circuit to be in a disconnected state, controlling the third terminal and the sixth terminal of the reset circuit to be in a disconnected state, controlling the first terminal and the second terminal of the photosensitive control circuit to be in a conducting state, and controlling the third terminal and the fourth terminal of the photosensitive control circuit to be in a conducting state, thereby writing an induced level generated by induced charges of the photodiode into the first node, and writing a threshold voltage of a switch element electrically coupled to the first control terminal of the output circuit and a first level of the first level terminal into the second node;
in a reading phase, controlling the first terminal and the second terminal of the photosensitive control circuit to be in a disconnected state, controlling the third terminal and the fourth terminal of the photosensitive control circuit to be in a disconnected state;
controlling the first terminal and the fourth terminal of the reset circuit to be in a conducting state, controlling the first terminal and the third terminal of the output circuit to be in a conducting state; under action of the charge storage circuit, enabling a level of the second node to become a driving level, thereby enabling the third terminal of the output circuit to output a driving current; wherein the driving level is generated based on the induced level and a sum of the threshold voltage, the first level and the reference level.

19. A pixel circuit, comprising:

a charge storage circuit, wherein a first terminal and a second terminal of the charge storage circuit are electrically coupled to a first node and a second node, respectively;

a reset circuit, wherein a first control terminal of the reset circuit is electrically coupled to a reset control signal line, a second control terminal of the reset circuit is electrically coupled to a scan signal line; a first terminal, a second terminal and a third terminal of the reset circuit are electrically coupled to a reference signal line, a first initialization signal line, and a second initialization signal line, respectively; a fourth terminal, a fifth terminal, and a sixth terminal of the reset circuit are electrically coupled to the first node, a photodiode of the pixel circuit and the second node, respectively;

a photosensitive control circuit, wherein a control terminal of the photosensitive control circuit is electrically coupled to a gate signal line; a first terminal, a second terminal and a third terminal of the photosensitive control circuit are electrically coupled to the photodiode, the first node and the second node, respectively; and an output circuit, wherein a first control terminal of the output circuit is electrically coupled to the second node, a second control terminal of the output circuit is electrically coupled to a scan signal line, a first terminal and a second terminal of the output circuit are electrically coupled to a first level terminal and a fourth terminal of the photosensitive control circuit, respectively, wherein the output circuit includes a first driving circuit and a second driving circuit;

a control terminal and a first terminal of the first driving circuit serve as the first control terminal and the first terminal of the output circuit, respectively;

a second terminal of the first driving circuit and a first terminal of the second driving circuit together serve as the second terminal of the output circuit;

a control terminal and a second terminal of the second driving circuit serve as the second control terminal and the third terminal of the output circuit, respectively.

* * * * *